United States Patent [19]
Weinstein

[11] 3,824,854
[45] July 23, 1974

[54] SOUND TRIM APPARATUS FOR BOAT SPEEDOMETER

[75] Inventor: Albert Weinstein, Alexandria, Va.

[73] Assignee: Westinghouse Electric Corporation, Pittsburgh, Pa.

[22] Filed: Mar. 23, 1973

[21] Appl. No.: 344,324

[52] U.S. Cl. .................. 73/185, 73/187, 73/229, 73/506
[51] Int. Cl. .................................... G01c 21/10
[58] Field of Search ............ 73/185, 187, 229, 189, 73/506; 116/73, 74

[56] References Cited
UNITED STATES PATENTS

| | | | |
|---|---|---|---|
| 914,959 | 3/1909 | Lallie | 73/189 |
| 3,756,077 | 9/1973 | Milovancevic | 73/187 |

Primary Examiner—Donald O. Woodiel
Attorney, Agent, or Firm—D. Schron

[57] ABSTRACT

The sound generating device is mounted on a boat responsive to a shaft rotating at a speed proportional to the speed of the boat. Fixed to the shaft is a cam. Upon each rotation of the shaft, the cam engages a trip hammer which is mounted on support means. The trip hammer is biased by a spring which tends to hold the hammer stationary against the support means. Upon each rotation of the shaft, the cam engages the trip hammer causing it to rotate against a strike plate, thereby creating a clicking sound. The frequency of the clicks and consequently the pitch of the sound varies directly with the speed of the boat, thereby giving an indication of the speed and the change in speed without requiring the operator to divert his attention to look at a speedometer dial.

8 Claims, 2 Drawing Figures

SOUND TRIM APPARATUS FOR BOAT SPEEDOMETER

BACKGROUND OF THE INVENTION

1. Field of the Invention

This invention relates generally to an improvement in boat speedometers, and more particularly, to the use of a sound-making device to provide auditory indication of the speed of a boat.

2. Description of the Prior Art

Sailors, particularly those engaged in racing sailboats, often need to know the speed of their boats relative to the water or land. Speedometers of various kinds are available on the market for this purpose.

Various conventional methods of determining ship speed include paying out a knotted line off the stern of a ship into the water and visually counting the number of knots on the line paid out during a given period of time. Another method is that of measuring the drag created by pulling a small object through the water, the drag being functionally related to the speed of the boat. A third measuring device utilizes an impeller towed at the end of a long line, movement of the impeller through the water causing it to rotate and the speed of its rotation being used to determine the speed of the boat. Another device is a pitot tube placed in the water at a given level so that kinetic pressure of water causes the water level in the tube to rise until the kinetic pressure is balanced by the static pressure. All of these methods of measuring the boat speed usually include some type of dial on which the speed is registered.

In U.S. Pat. No. 3,664,189 issued on May 23, 1972 to Albert Weinstein, applicant herein, another particular boat speedometer is described and claimed which includes a flexible resilient shaft journalled to a support and extending into the water. One end drives a speedometer head and the free end carries an impeller which is rotated by the movement of the boat in the water. This speedometer is particularly adaptable to the present improvement which is described and claimed herein.

Oftentimes, the sailor in the sailboat or small power boat must devote his full attention to the operation of the boat. Consequently, the operator is unable to divert his attention to the dial of the speedometer even momentarily. Further, it is very difficult to detect changes in the speed of the boat. The operator may not be able to look at the speedometer frequently enough to know when the boat is changing speeds.

SUMMARY OF THE INVENTION

Briefly, the invention is an improvement for boat speedometers which enables the operator to be aware of the speed of the boat and particularly the change in speed of the boat, at all times without diverting his attention from the normal operation of the boat. The present invention provides for a sound trim apparatus for attachment to a boat comprising a water-driven impeller which rotatably drives a shaft having a cam mounted thereon. Upon each rotation of the shaft, the cam causes a trip hammer to move from a first position to hit against a strike plate positioned in the path of movement of the hammer. A spring biases the trip hammer tending to hold it in the first position. The faster the cam turns on the hammer, the more frequent will be the clicking sound generated by the hammer hitting against the strike plate. Therefore, the pitch of the sound will increase with an increase in the speed of the boat and decrease with a decrease in the speed of the boat.

DETAILED DESCRIPTION OF THE DRAWINGS

Figure 1:
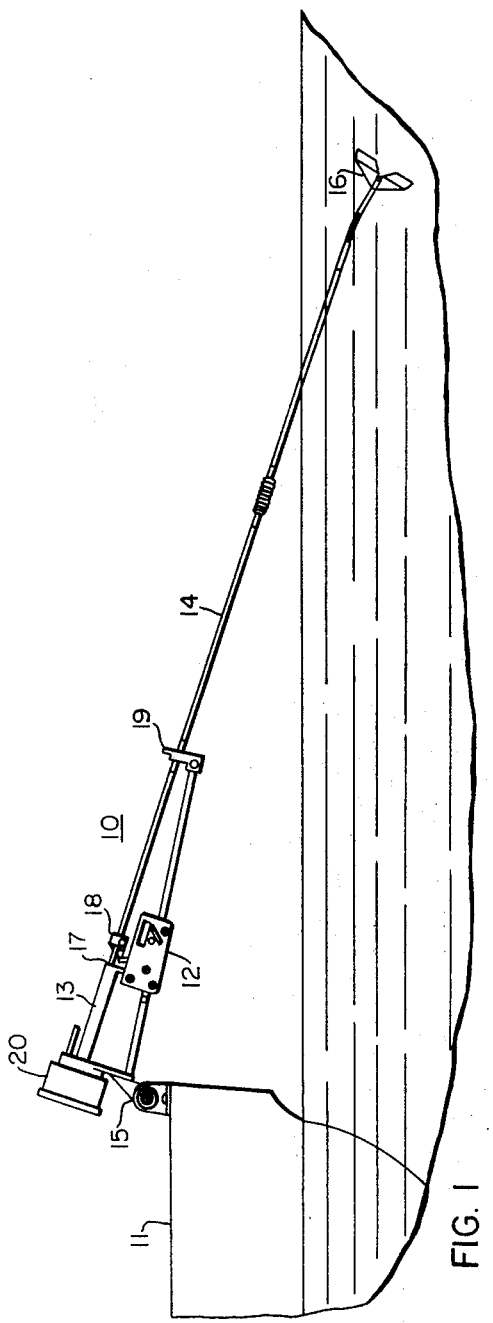
FIG. 1 is a side elevational view of a speedometer mounted on the stern of a boat having the sound trim apparatus of the present invention affixed thereon.

Referring now to the accompanying drawings and more particularly to FIG. 1, the boat speedometer assembly 10 is rotatably mounted on the stern of boat 11 by fixture 15. The shaft 14, having impeller 16 mounted on one end journalled at the other end at bearing surface 17 of support framework 13, slants downwardly from the hull of the boat 11 toward the water. The shaft 14 is also journalled at intermediate support 19 of the support framework 13 in addition to bearing surface 17 so that the shaft can freely rotate. The rotating shaft 14 drives the speedometer head 20. The shaft 14, which typically can be fabricated from fiberglass, is resiliently flexible so as to align with the water slipstream and thereby reduce the drag of the impeller 16. The sound trim apparatus 12 is removably mounted to the support framework 13. Cam 18, which is fixed to shaft 14, is mounted in close relationship to the sound trim apparatus 12.

A more complete and detailed description of this type of speedometer without the sound trim apparatus 12 is given in the above referenced patent to Weinstein. It will be appreciated in the discussion to follow that the sound trim 12 can be used with other boat speedometers and that it could indeed be used without a speedometer head at all.

Figure 2:
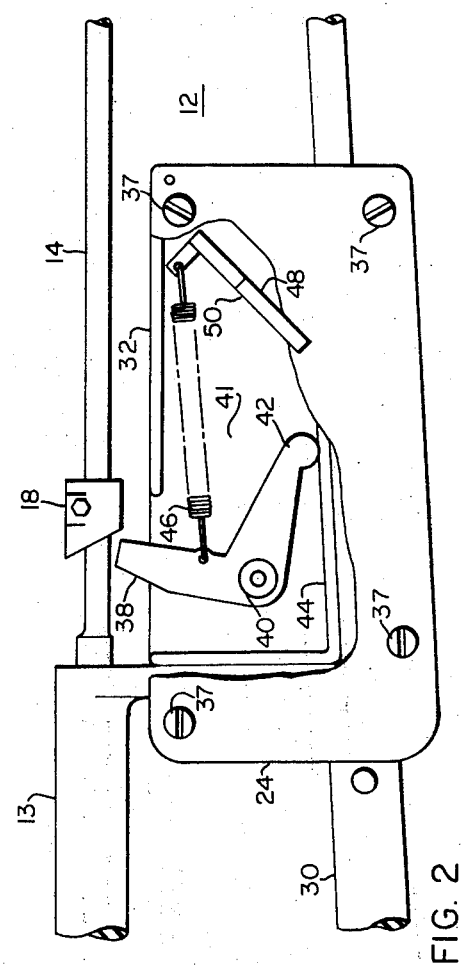
FIG. 2 is a partially broken away, side elevational view of one embodiment of the present invention.

In FIG. 2, the sound trim apparatus 12 of this invention is shown in detail with the face plate 24 partially cut away. The sound trim apparatus 12 is removably mounted to strut 30 of support framework 13. The sound trim apparatus 12 fits over strut 30 so as to slide into place with the top surface 32 of sound trim case 34 substantially parallel to, but spaced apart from, shaft 14. The sound trim apparatus 12 in its final position abuts firmly against vertical number 36 of the framework 13 and is held firmly in place by screws 37.

The cam 18 is firmly affixed to and rotate with shaft 14. The cam 18 is positioned on shaft 14 to engage the trip hammer 38 upon each revolution of the shaft. As shaft 14 turns and cam 18 engages trip hammer 38, it causes trip hammer 38 to rotate about the pivotal pin 40. Pin 40 is rigidly attached to back faceplate 41 of the sound trim assembly 12.

The lower end 42 of trip hammer 38 acts as a hammer striking the bottom interior surface 44 of sound trim case 34. The surface 44 functions as a strike plate and striking action occurs once per revolution of shaft 14.

Spring 46 is attached to the upper part of the L-shaped trim hammer 38 so as to bias the trip rod in a first position causing the lower end 42 of trip hammer 38 to abut the surface 44 when cam 18 is in the up position shown in FIG. 2. Mechanical switch 48 is attached to the other end of spring 46 and is rotatably connected to back faceplate 42 by means of pin 50. The tension on spring 46 can be adjusted by means of the switch 48 so that the sound level of the clicking can be increased or decreased. When all tension on the spring is removed by rotating switch 48 to an extreme counterclockwise position the trip hammer 38 is completely disengaged from the rotating cam 18 and the sound trim 12 is disabled.

It will readily be seen that for each revolution of the rotating shaft 14 a distinct clicking sound is generated by the lower end of trip hammer 38 striking the plate 44 when the proper tension is placed on spring 46. As the boat speed increases, the rotating shaft 14 will spin faster, thereby causing an increase in the frequency of clicks. If the boat loses speed, the rotating shaft 14 spins more slowly, causing a decrease in the frequency of clicks. The operator of the boat, therefore, is able to continuously monitor the speed of the boat by listening to the sound and frequency of the clicks. An increase in boat speed will increase the pitch of the sound. The operator of the boat is thereby freed to make adjustments as necessary such as trimming the sails of a sailboat to maximize the speed of the boat.

The sound trim apparatus 12 can be mounted to any type speedometer which is adaptable to having a rod or shaft rotate at a speed proportional to the speed of the boat. It will be appreciated that the sound trim apparatus 12 may also be used without a speedometer head as such. That is, it may be mounted on a boat next to, and operable with, a shaft which rotates at a speed proportional to the speed of the boat without any other speedometer device being attached.

The sound trim case 34, with face plate 24 in place, is so configured to cause the sound to resonate thereby effectively acting as a resonator case. This is analogous to shaping the body of a drum to achieve a particular percussion effect. The case 34 can similarly be shaped for optimizing the sound for the most usual operating conditions.

I claim:

1. A sound trim apparatus for use with a boat speedometer comprising:
   a water driven impeller,
   a shaft attached and rotatably responsive to said impeller,
   cam means mounted on said shaft,
   a trip hammer mounted next adjacent said cam means so as to be tripped by said cam means upon rotation of said shaft to move said hammer from a first position,
   a spring means connected to said trip hammer for maintaining tension on said trip hammer tending to hold said trip hammer in said first position, and
   a strike plate positioned in the path of movement of said hammer for producing sound when struck so that the pitch of said sound varies with the frequency of said rotations of said shaft.

2. A sound trim apparatus as defined in claim 1, wherein said spring means includes a coil spring and means for adjusting the tension on said spring.

3. A sound trim apparatus as defined in claim 1, further including a resonator case enclosing said trip hammer, said spring means and said strike plate for resonating sound.

4. A sound trim apparatus as defined in claim 3, further including means connected to said spring means for adjusting the tension on said spring means so arranged and constructed to adjust the sound level.

5. A sound trim apparatus for use with a boat speedometer having a shaft adapted to rotate at a speed in proportion to the speed of the boat comprising:
   cam means mounted on said shaft,
   support means mounted adjacent said shaft,
   a trip hammer rotatably affixed to said support means next adjacent said cam means so arranged and constructed to rotate when engaged by said cam means,
   spring means connected between said support means and said trip hammer tending to hold said trip hammer against said support means, and
   a strike plate positioned in the path of rotational movement of said hammer for producing sound when struck by said hammer.

6. The sound trim apparatus of claim 5 wherein said spring means includes a spring and means for adjusting the tension on said spring.

7. The sound trim apparatus of claim 5, further including a resonator case enclosing said trip hammer, said spring means, and said strike plate for resonating sound.

8. The sound trim apparatus of claim 7, further including means connected to said spring means for adjusting the tension on said spring for adjusting the sound level.

* * * * *